United States Patent Office.

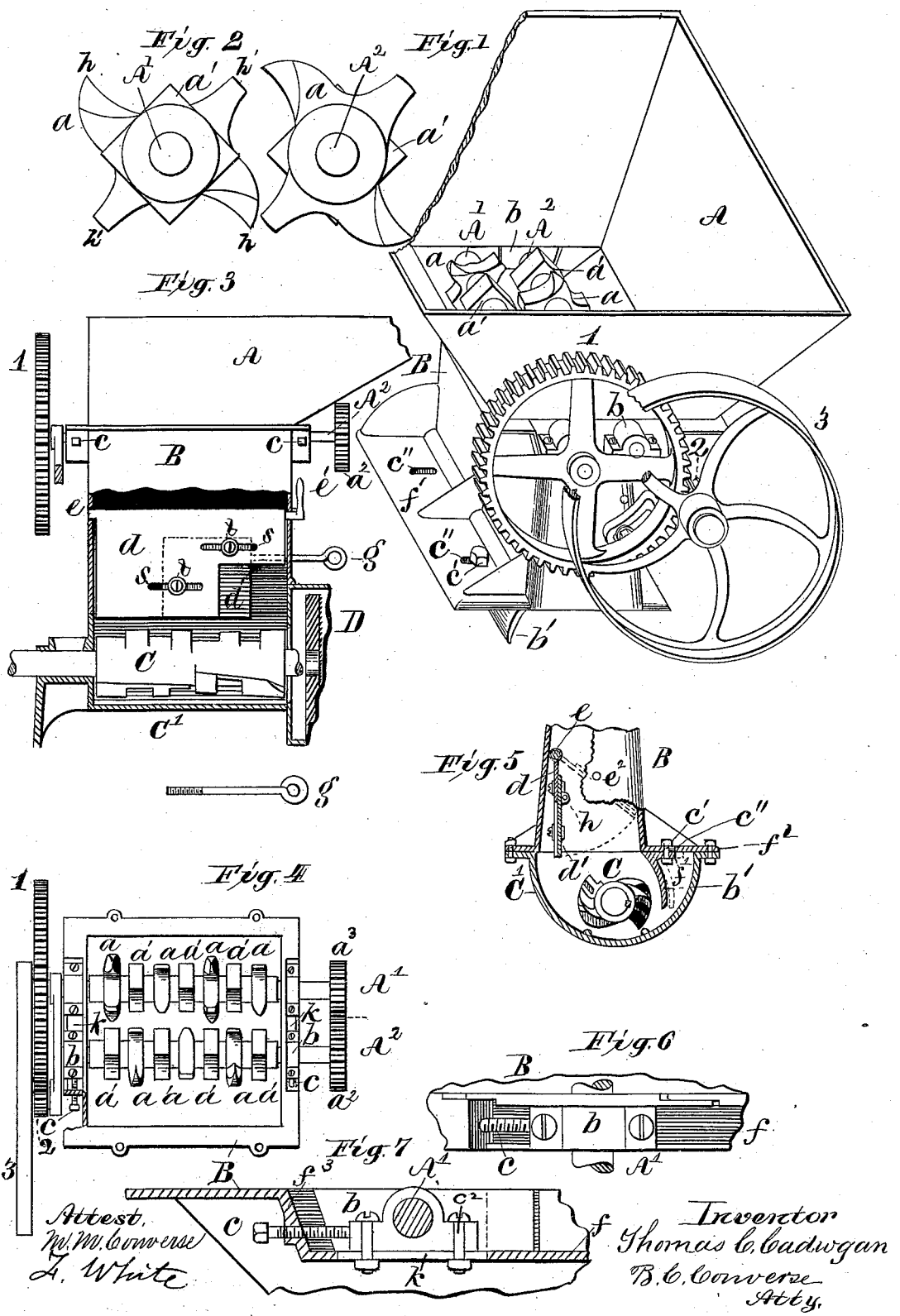

THOMAS C. CADWGAN, OF SPRINGFIELD, OHIO, ASSIGNOR TO THE DUPLEX MANUFACTURING COMPANY, OF SAME PLACE.

FEED-MILL.

SPECIFICATION forming part of Letters Patent No. 376,232, dated January 10, 1888.

Application filed May 26, 1887. Serial No. 239,399. (No model.)

*To all whom it may concern:*

Be it known that I, THOMAS C. CADWGAN, a citizen of the United States, residing at Springfield, in the county of Clark and State of Ohio, have invented certain new and useful Improvements in Feed-Mills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in feed-mills; and it consists in the novel construction and combination of parts hereinafter described, and particularly pointed out in the claims.

My improvement is applicable to the feed-mill shown in application, Serial No. 212,125, filed August 28, 1886, for which a patent is now pending.

Figure 1 is a perspective view of the hopper and upper part of the case of a mill embodying my improvement. Fig. 2 shows end views of the feeders, enlarged. Fig. 3 is an elevation of the parts shown in Fig. 1 with the crusher and its case attached, the latter being shown in section. In this view the double valve and its connections are shown. Fig. 4 is a top view of the feeders and case, the hopper being removed. Fig. 5 is a cross-section of the case, (below the feeders,) the valve and the crusher part of the case being shown in elevation. It also shows a cross-section of the adjustable concave plate, which latter is operated in connection with the crusher. Fig. 6 is a top view of one of the boxes or bearings of the adjustable feeder. Fig. 7 is a side elevation of the same with a portion of the top of the case.

The feed mechanism consists of the two parallel shafts A' A², having the alternating square and irregular formed bodies $a'$ and $a$ thereon, said bodies being by preference cast together. The bodies $a$ have oppositely-projecting hooks $h$ and projecting stubs $h'$ at right angles to the hooks. They alternate in their arrangement on each shaft, and those on one shaft alternate with the bodies on the other, the bodies $a$ on one shaft being opposite to the bodies $a'$ on the other shaft. These shafts extend longitudinally across the top part of case B below the hopper A on either side of the central longitudinal line of the latter. The shaft A' is provided with a large spur-wheel, 1, at one end, which is engaged by a pinion, 2, on the inner end of the hub of the belt-wheel 3 (seen in Fig. 1) at one end of the case B, (this arrangement for driving a single feeder being like that shown in my application referred to.) The two shafts A' and A² are geared together at their ends opposite the spur-wheel 1, as seen in Fig. 4, by two pinions, $a^3$ and $a^2$. These pinions differ in size, causing the shafts to run at unequal speeds, or differentially, for the purpose of keeping the material in the hopper better stirred up or agitated and preventing it from banking upon either side.

The form given to the bodies $a$ and $a'$ is such as to cause large substances—such as ear-corn—to be more or less broken in its passage between them. They also facilitate the feeding of chaffy or light material by keeping it in agitation by their varied angles.

In operating, the shafts A' and A² rotate toward each other.

To change from ear corn to small grain, a double valve, $d\ d'$, is provided for better regulating the amount of discharge. This valve consists of a broad flat plate extending from end to end inside of case B. It is pivoted by a rod, $e$, which extends through holes in the end walls of the case, and hangs perpendicularly near one side when not in use. By reference to Fig. 3 it will be noticed that a square notch is cut out of the lower right corner, near the grinding-case D, to allow of the passage of the grain through a hole formed in this notch, when the valve is swung upward till its lower edge touches the opposite wall from that one near which it is hung, as seen in Fig. 5 in dotted lines. To regulate the size of the discharge-hole, a smaller plate, $d'$, slides over the notch, it being provided with screw-studs $t\ t$, which extend through the longitudinal slots $s\ s$, formed in plate $d$. A rod, $g$, having a screw-threaded end, is inserted through a hole, $e^2$, (seen in the end of case B,) and into a lug, $h$, on the small valve $d'$, and by this latter means the valve $d\ d'$ is held in the position seen in the dotted lines, Fig. 5. The rod $g$ performs the double function of holding the valve $d$ closed and of operating the small sliding valve $d'$. As the crusher C (seen in case C') is not required in the operation (which its name implies) of grinding small grain, but only as a means of forcing the grain into the grinding-case D, the object in locating the discharge in near proximity to the latter is obvious. When the valve is not in use, the rod $g$ can be unscrewed from the lug $h$ and withdrawn, and the valve allowed to swing down out of the way, as seen in the figures before referred to, leaving the throat-opening in case B free for the passage of corn in the cob or other large substances.

To facilitate crushing the corn ears, a concave plate, $b'$, is introduced into the crusher-case C' on one side, as seen in Figs. 1 and 5. In shape it is like a longitudinal section of a cylinder, and has a flat flange, $f'$, extending from its upper edge outward under the lower flange, $f^2$, of the case B, to which it is secured by bolts $c'$. The transverse slots $c''$, through which these bolts extend in the foot-flange $f'$, allow the concave plate $b'$ to be adjusted toward or from the crusher C, as may be required in crushing large or small corn or other substances, and to be secured in adjustment.

By reference to Figs. 4, 6, and 7 it will be noticed that the slow-motioned shaft $A^2$ is made adjustable toward or from the shaft $A'$ by means of the bearings $b$, which latter slide on the top flange, $f$, of case B. A slot, $k$, (see Figs. 4 and 7,) in this flange, through which the bolts $c^2$ of the bearings extend, allows the latter to slide on the flange when the bolts are loosened. The set-screws $cc$, extending through a part of the flange-wall above the seat of the bearings, as indicated at $f^3$, Fig. 7, serve to retain the bearings at any point of adjustment. The flange $f$, as is shown in the latter figure, is continuous, but is made lower where the boxes or bearings $b\ b$ rest, to bring the axis of the two shafts below the meeting line of the hopper and case and to allow of the shafts being secured, as described, in the latter.

By reference to Fig. 4 the position of the bearings can be ascertained by the location of the adjusting-screws $c\ c$, as well as in Fig. 7. By the introduction of the valve $d$ to close the throat of case B, leaving only a hole adjacent to D, (by means of the notch and valve $d'$ sliding over the latter,) small grain can be carried to the grinding-case, ground, and discharged without liability of choking, which would be the result in grinding, especially damp grain, without this valve.

In feeding corn in the ear it is well known that with shafts moving at the same speed and with uniform teeth the corn is often shelled from the cobs, and the latter are made to rotate till denuded of kernels before passing through the feeders. I have therefore obviated this difficulty by the means described in constructing the shafts with the bodies $a$ and $a'$ of the form shown and varying the speed of the two shafts, so as to prevent the successive approximation of the same angles of said bodies in operating.

I claim as my invention—

1. In a mill, the combination of a casing, two parallel feeder-shafts arranged therein, and each provided with alternate substantially-square projections $a'$ and irregular bodies $a$, having projections, as $h\ h'$, said bodies on the two shafts being arranged opposite to each other, and means for rotating said shafts, substantially as set forth.

2. In a grinding-mill, the combination of a casing, two parallel feeder-shafts arranged therein, and each provided with alternate substantially-square bodies $a'$ and irregularly-shaped bodies $a$, having projections, as $h\ h'$, opposite the square bodies on the other shaft, and differential gearing for driving said shafts at different speeds, substantially as set forth.

3. In a feed-mill, the combination of a casing, feeders mounted therein, a broad plate-valve pivotally suspended under the feeders in the throat of the case adapted to close the latter and having a notch or discharge-hole, in combination with a slide-valve operating thereon over said notch or discharge-hole, said slide-valve being provided with means for adjustment, substantially as and for the purpose set forth.

4. In a feed-mill, the combination, with the crusher-case C' and the grinder-case D to one side thereof, of a swinging valve pivoted in the throat of the former and having a notch therein next the grinding-case, a slide-valve operating on said swinging valve over said notch, and a detachable screw-threaded rod extending through the end wall of said case and engaging a hole in said slide-valve to retain said swinging valve in a closed position and to operate said slide-valve, as set forth.

5. The combination, with the feeders, the crusher, and grinding devices, and the case provided with the hole $e^2$, of the double valve consisting of the pivoted swinging plate having a notch therein to form the discharge-orifice, the slide-valve operating over the latter, having the screw-threaded lug, and the detachable screw-threaded rod adapted to be inserted through said hole $e^2$ into said lug to operate both said valves, as set forth.

6. In a grinding-mill, the combination of the crusher-case C', the crushers C, mounted therein, the case B, through which the material is fed to case C', having a flange, $f^2$, forming in part a cover to the case C', a concave plate mounted opposite the crusher and provided with a flange, $f'$, by which it is secured to the under side of the flange $f^2$, and means for adjusting the said concave, substantially as set forth.

In testimony whereof I affix my signature in presence of two witnesses.

THOMAS C. CADWGAN.

Witnesses:
B. C. CONVERSE,
FLETCHER WHITE.